(12) United States Patent
Balinsky et al.

(10) Patent No.: US 11,036,880 B2
(45) Date of Patent: Jun. 15, 2021

(54) DATASETS REPRESENTING ASPECTS OF 3D OBJECT

(71) Applicant: HEWLETT-PACKARD DEVELOPMENT COMPANY, L.P., Spring, TX (US)

(72) Inventors: Helen Balinsky, Bristol (GB); Scott White, Sant Cugat del Valles (ES); Robert Taylor, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 66 days.

(21) Appl. No.: 16/074,105

(22) PCT Filed: Sep. 16, 2016

(86) PCT No.: PCT/US2016/052245
§ 371 (c)(1),
(2) Date: Jul. 31, 2018

(87) PCT Pub. No.: WO2018/052444
PCT Pub. Date: Mar. 22, 2018

(65) Prior Publication Data
US 2020/0151355 A1 May 14, 2020

(51) Int. Cl.
*G06F 21/00* (2013.01)
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
None
See application file for complete search history.

(56) References Cited

U.S. PATENT DOCUMENTS

| 8,763,140 B2 | 6/2014 | Marcus et al. | |
| 2011/0202553 A1* | 8/2011 | Salemann | G06F 3/011 707/769 |
| 2014/0058959 A1* | 2/2014 | Isbjornssund | G06Q 50/184 705/310 |

(Continued)

FOREIGN PATENT DOCUMENTS

| EP | 1946470 A1 | 7/2008 |
| EP | 2701090 A1 | 2/2014 |

(Continued)

OTHER PUBLICATIONS

Kandala et al., "Secure Role-Based Workflow Models", Retrieved from Internet: http://profsandhu.com/confrnc/ifip/i01-rbwm.pdf, 2001, 14 Pages.

*Primary Examiner* — Andrew J Steinle
(74) *Attorney, Agent, or Firm* — Staas & Halsey LLP

(57) ABSTRACT

In an example, a method includes acquiring, at a processor, object generation source data representing a three-dimensional object to be generated in additive manufacturing. A dataset which is representative of an aspect of the three-dimensional object may be determined from the object generation source data. Digital security may be applied to the object generation source data and the dataset. The digital security applied to the object generation source data may be different from that which is applied to the dataset.

13 Claims, 4 Drawing Sheets

(56) References Cited

U.S. PATENT DOCUMENTS

| | | |
|---|---|---|
| 2014/0156053 A1 | 6/2014 | Mandavi et al. |
| 2014/0157579 A1 | 6/2014 | Chhabra et al. |
| 2015/0170242 A1 | 6/2015 | Bjorndahl |
| 2015/0221053 A1 | 8/2015 | Tapley et al. |
| 2015/0253761 A1* | 9/2015 | Nelson ............... G06F 3/1238 700/98 |
| 2015/0332058 A1 | 11/2015 | Chen et al. |
| 2015/0347932 A1 | 12/2015 | Harris et al. |

FOREIGN PATENT DOCUMENTS

| | | |
|---|---|---|
| EP | 2701893 A2 | 3/2014 |
| WO | 2013036942 A1 | 3/2013 |
| WO | WO-2013149296 | 10/2013 |
| WO | 2014111587 A2 | 7/2014 |
| WO | 2015116341 A1 | 8/2015 |

* cited by examiner

DATASETS REPRESENTING ASPECTS OF 3D OBJECT

BACKGROUND

Three-dimensional objects generated by an additive manufacturing process may be formed in a layer-by-layer manner. In one example of additive manufacturing, an object is generated by solidifying portions of layers of build material. In other examples, three-dimensional objects may be generated using extruded plastics or sprayed materials as build materials, which solidify to form an object.

Additive manufacturing systems may generate objects based on design data. This may involve a designer generating a three-dimensional model of an object to be generated, for example using a computer aided design (CAD) application. Some object generation processes that generate three-dimensional objects use control data generated from such a model of a three-dimensional object. This control data may, for example, specify the locations at which to apply an agent to the build material, or where a build material itself may be placed, and the amounts to be placed.

BRIEF DESCRIPTION OF DRAWINGS

Non-limiting examples will now be described with reference to the accompanying drawings, in which.

DETAILED DESCRIPTION

Figure 1:
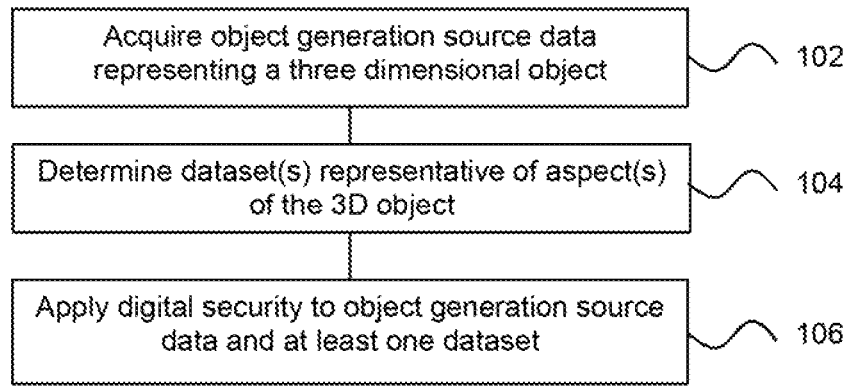
FIG. 1 is a flowchart of an example method of determining and applying digital security to a dataset.

Some additive manufacturing systems employ digital models of an object to be generated. For example, a model may define the solid portions of the object, and may in some examples associate intended properties and/or materials with all or portions of the object.

Such a model may be generated using considerable skill and labour and thus has a value to the designer or another owner of the data. As such, it may be intended to protect the data, for example by encryption and the like. However, in order to manufacture an object to the design data, the data may be exposed to various parties. For example, a design data owner may offer the design for purchase, or may wish to request a cost estimate or manufacturing schedule for generating an object. In this way, design data may be exposed to at least one party. In some examples, this data exposure may take place before any contractual relationship is established.

Additive manufacturing techniques may generate a three-dimensional object through the solidification of a build material. This may be carried out in a layer-by-layer manner and, in some such examples, a digital model can be processed to generate slices of parallel planes of the model. Each slice may define a portion of a respective layer of build material that is to be solidified or caused to coalesce by the additive manufacturing system. The properties of generated objects may depend on the type of build material and the type of solidification mechanism used. Build material may be deposited, for example on a print bed and processed layer by layer, for example within a fabrication chamber.

In some examples, the build material may be a powder-like granular material, which may for example be a plastic, ceramic or metal powder. Selective solidification may be achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated. The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In some examples herein, three-dimensional space is characterised in terms of 'voxels' (by analogy to two-dimensional 'pixels'), wherein each voxel occupies a discrete volume. In data modelling a three-dimensional object, a voxel at a given location may have at least one attribute. For example, it may be empty, or may be associated with a particular material and/or object property which that voxel is intended to have in the generated article. Object properties may comprise for example appearance properties (color, transparency, glossiness, etc.), conductivity, density, porosity and/or mechanical properties such as strength, and different object portions may comprise different object properties.

The voxels representing an object may have the same shape (for example, cubic or tetrahedral), or may differ in shape and/or size. A voxel may correspond to a region of a three-dimensional object which is an individually addressable area in additive manufacturing, or may be defined in some other way. In some examples in which the intended solidification and/or physical properties may be achieved by printing an agent onto a layer of the build material to form a slice of an object, a voxel may represent a volume defined by the thickness of a layer of build material and the surface area of a layer which can be individually addressed with an agent. In some contexts, a voxel may be the resolution to which an object model, an object, or object generation data, is defined.

FIG. 1 is an example of a method, which may be implemented using at least one processor. In some examples, the method may be implemented in a secure data processing environment. In some examples, the method may be carried out in an environment controlled by, or trusted by, a designer or design owner.

Block 102 comprises acquiring object generation source data representing a three-dimensional object to be generated in additive manufacturing. Such object generation source data may be suitable to provide an input into an additive manufacturing workflow, and may comprise all the design data necessary for object generation. In some examples, the object generation source may be suitable to allow an object to be generated at least substantially automatically. In other words, although processing of the data may be carried out in order to develop control data for generating the object, such processing will not comprise developing design data or substantial user/designer input. In some examples, the object generation source data may be or comprise control data to control an additive manufacturing apparatus to generate the object, for example comprising control data for an additive manufacturing apparatus. In other examples, the object generation source data may be processed, for example using mapping tables, to determine what materials are to be used in generating the object, and processing (for example, halftoning) to determine where the materials should be placed, and the like.

In an example, the object generation source data comprises object model data and object property data. The object model data may define a three-dimensional model of at least a portion of the object, for example defining the shape and extent (e.g. the solid portions of the object) of all or part of an object in a three-dimensional co-ordinate system. The object model data may for example be data generated by a computer aided design (CAD) application or the like. Object property data may for example define at least one object property for the three-dimensional object to be generated. For example, object property data may comprise a color, flexibility, elasticity, rigidity, surface roughness, porosity, inter-layer strength, density, conductivity and the like for at least a portion of the object to be generated. In some examples, rather than being described in terms of property values, the object property data may be described in terms of materials, for example, build materials and/or print agents to be used in generating the object. Such object property data may be defined, for example, for the whole of an object to be generated (global property data) or for one or multiple portions of an object to be generated (local property data). Object property data may define multiple object properties for a portion or portions of an object.

Such object generation source data may be received as a single file or as multiple data objects. In some examples, the object model data may be provided in terms of voxels that are defined in a three-dimensional (also referred to herein as [x,y,z]) space. A given voxel may have an attribute. For example, a voxel may associated data that indicates whether a portion of the model object is present at that location. In some examples, object property values (for example as defined in object property data) may be associated with each voxel as an attribute thereof. Object property data may thereby be associated with a set of voxels, e.g. ranging from individual voxels to all voxels associated with the object.

For example, object model data may describe a number of voxels, each of which has an intended relative location in space. In relation to at least one of those voxels, at least one property value may be specified: for example, a particular voxel may be red (or a particular red) and transparent, while another voxel may be blue and have a particular density. In one example, the object generation source data comprises a model of a three-dimensional object that has at least one object property specified at every location within the model, e.g. at every [x, y, z] co-ordinate.

Other object representations, for example vector representations, mesh representations, Stereolithography (STL) file format, OBJ file format, or the like may be used.

Block 104 comprises determining, from the object generation source data, a dataset which is representative of an aspect of the three-dimensional object. In some examples, a plurality of datasets may be determined which are representative of different aspects. An aspect of the object may be any data relating to the object other than the full object generation source data. Therefore, as used herein, the term 'aspect' takes the meaning of being any part, feature or characteristic of the object. For example, an aspect of the object may be at least part of an object's appearance, properties, geometry or materials. An aspect may be a generalisation of information in the object generation source data. There may be more than one aspect in each category— for example, different views of the object could provide different appearance aspects, and/or the object's geometry could be represented in different ways to expose different aspects of the object (for example, external geometry and internal geometry). Viewed another way, a dataset which represents an aspect of the object may omit at least a portion of the data contained in the object generation source data. Such a dataset which is representative of an aspect of the object is determined (e.g. derived or computed) from the object generation source data.

As is set out in greater detail below, such datasets may be of use (and, in some cases, tailored for use) by particular entities which may perform a role in an object generation (or data processing for object generation) pipeline, and may allow those entities to perform tasks without gaining access to the object generation source data. The datasets may be determined at the same time, one after the other, or at different times (for example, on different days). In some examples, datasets are determined in anticipation of their expected use in an object generation workflow. The choice between determining datasets in advance or on request (and/or the combination of these techniques) may depend on criteria such as intended use cases, processing and memory capabilities, whether the structure of a dataset can be determined in advance, or the like.

Block 106 comprises applying digital security to the object generation source data and at least one dataset, wherein the digital security applied to the object generation source data is different to the security applied to the dataset. The digital security applied may for example comprise encrypting the source data and dataset with a key or password, wherein the password/key is different between the source data and the dataset. In some examples, the type of security applied may be different, for example, a more computationally expensive and/or secure digital security may be applied to one of the source data and the dataset(s). In some examples, more secure digital protection may be provided to the source data than to the dataset. In general, the same, similar or different levels of protection can be applied to the source data and each dataset, and/or different keys used, to provide differential security. In some examples, digital security may be applied when the source data and/or a dataset is generated. In other examples, digital security may be applied in advance of transmission of the source data or dataset, for example once an intended recipient has been identified. In some examples, the differential security applied may comprise different access rights, for example, read-write access rights, or read-only access rights. In some examples, the digital security may be specific to an intended recipient.

As is further set out below, where a plurality of datasets are generated, these may be processed differently, for example according to separate cryptographic processes. In some examples, at least one dataset may be free of digital security. Protected (and, in some examples, unprotected) datasets maybe combined into a single object, in some examples with the source data (which may also be protected) or stored and/or transmitted separately.

At least one dataset may be transmitted or accessed together with or separately from the object generation source data and/or from any other dataset. Different datasets may be provided (and in some examples, encrypted) for particular entities operating in the object generation workflow.

In an additive manufacturing/object generation workflow, there may be various entities which call for some knowledge of the object to be generated. However, while the entities may be trusted to perform their assigned workflow task, in some examples (or as a matter of data security good practise), the entities and/or data communication security may not be fully trusted. This may be, for example, as data security is not assured, for example during data transfer or at the entity site. In other examples, there may be a concern that design data may be maliciously accessed, modified, retained or passed on.

However, it may be the case that certain tasks in an additive manufacturing workflow may be accomplished through provision of data representing just an aspect of the object (which may be an aspect of an object which is intended to allow completion of a particular task). By deriving and transmitting or providing access to datasets (which in some examples may be computed ahead of time, anticipating which aspects may be useful) which represent appropriate aspects of the object, the workflow may proceed while distribution of the object generation source data itself may be controlled in some examples being minimised or reduced. Each workflow participant may include human interaction or may operate entirely automatically.

In an example, a design owner (or in other examples, a workflow controlling entity, or workflow owner, who may be a design owner or a three-dimensional object generation workflow service provider, or some other entity) may be seeking a manufacturer. In order to identify an appropriate manufacturer, the capabilities of a particular manufacturer may be matched to aspects of the object to be manufactured. For example, a manufacturer may seek information to determine whether it is feasible to manufacture an object, given the capabilities of their equipment. This decision may be based on the object properties: for example, is it possible for that manufacturer to generate an object having a specified color, conductivity, strength, density, size (is a fabrication chamber which is large enough available?), minimum feature size (does the object generation apparatus have at least a threshold resolution?), materials, etc. A dataset could be derived which allows such a feasibility assessment to be carried out without disclosing the object generation source data in its entirety. For example, detailed geometrical information may not be called for to allow such a feasibility assessment and could be left out of the dataset. An appropriate dataset, once generated, could be transmitted to or accessed by the manufacturer. In some examples, this may be encrypted using a public key of the manufacturer or manufacturing device, hybrid encryption involving a public key of a manufacturer, a key agreed between the workflow owner and manufacturer, or according to some other shared secret.

In another example, a purchaser may consider buying the design and therefore may be interested in its visual appearance, i.e. at least one appearance aspect. In such an example, a dataset to provide the potential purchaser with a preview or 'thumbnail' image of the design may be derived. This may provide sufficient information to allow the purchaser to decide if the design is suited to them. Such an image could be generated from the object generation source data, for example following processing thereof or, in examples, extracted from object generation source data (where some views of the object may exist, for example having been developed as part of the design profile). In some examples this appearance information may be provided at a lower resolution than the highest resolution available in the object generation source data. For example, appearance properties associated with a duster of voxels may be averaged to create a more general visual impression. In another example, in case of machinery parts, physical characteristics of just portions of an object may be provided to a potential buyer (geometrical aspects), for example accurate dimensions of different fragments and/or holes of the part, which may be sufficient for determining suitability for the particular to a particular task/machine.

This provides an element of obfuscation of the underlying design data. An appropriate dataset, once generated, could be transmitted to or accessed by the potential purchaser or other party. It may be noted that an appearance aspect dataset may contain different information and expose a different aspect of the object than a dataset described above which may be for sending to the manufacturer. In some examples, a dataset may be encrypted using a public key of the purchaser or workflow participant, or a key agreed between the workflow owner and potential purchaser, or some other shared secret. As such, even another workflow participant may be prevented for accessing the data as they do not hold the key. This may protect the data even in the event of transmission to a workflow participant for whom the data is not intended. In some examples, the data may also be signed to ensure integrity/authenticity of the information.

In other examples, a purchaser may be interested in some practical parameters (for example, will an object manufactured to the design be sufficiently strong for the intended use?), i.e. physical/mechanical property aspects. Such properties may form the basis of a dataset.

In another example, a chosen manufacturer may be preparing a 'batch' job, i.e. including various objects in one generation process. Such a manufacturer may call for information about geometrical aspects of an object, for example maximum dimensions (and in some examples, the full or approximate object geometry, including in some examples any voids as other objects may be manufactured in the voids), materials or properties for compatibility reasons.

In another example, a sales agent may be pricing an object generation process, and may benefit from information to determine the amount of materials which may be consumed in object generation. For example, this may comprise the materials themselves (a material-based aspect), or information allowing this to be determined (such as the intended properties). A dataset providing this information and not, for example, geometrical information, may be provided to a sales agent.

However, it may be noted that each of these activities—determining manufacturing feasibility, obtaining visual previews, 'batching' and object generation pricing—may be completed without full access to the object generation source data. While the some object generation source data may remain confidential, sufficient information for a workflow to successfully propagate (be successfully executed by different agents/participants) may be compiled as separate datasets. In such examples, data describing one aspect of an object may be decoupled from data describing another aspect (or from other data within the object generation source data), and used to compile a dataset.

The datasets may have different formats, and/or may be associated with different degrees of sensitivity. Such datasets may be transmitted/accessed as appropriate to different entities, possibly with different security levels, and/or using different cryptographic keys or the like. In some examples the datasets may have different owners, and/or be accessed by different entities for different purposes in the workflow and at different workflow stages. In some examples, at least one dataset may be determined and stored, for example with knowledge of what data may be of interest to different entities. In some examples, there may be a secure endpoint, to which the full object generation source data (for example, encrypted so as to allow decryption by the secure endpoint) may be sent, for example at or around the point that data is to be used. Individual datasets may be certified, for example by application of a digital signature. This may assure a workflow entity of the validity and integrity of the information therein.

Thus, in some examples, Information about the object to be generated may be distributed substantially on a 'need-to-know' basis, with access to sensitive information being restricted while allowing a workflow to propagate. The object generation source data may remain protected until an object is to be generated, and may be transmitted directly (and in some examples, in an encrypted format) to an endpoint and/or to a point in a workflow where it is of use for corresponding workflow task and, in some examples, where it can be assured that appropriate measures are put in place to ensure adequate data protection. In some examples, the endpoint may be a secure endpoint. As such, the number of secure execution environments may be kept low, for example comprising the just the start point (e.g. a data source) and endpoint. The data may be compartmentalised and differential access to individual parts of the overall data may be provided throughout the workflow.

Figure 2:
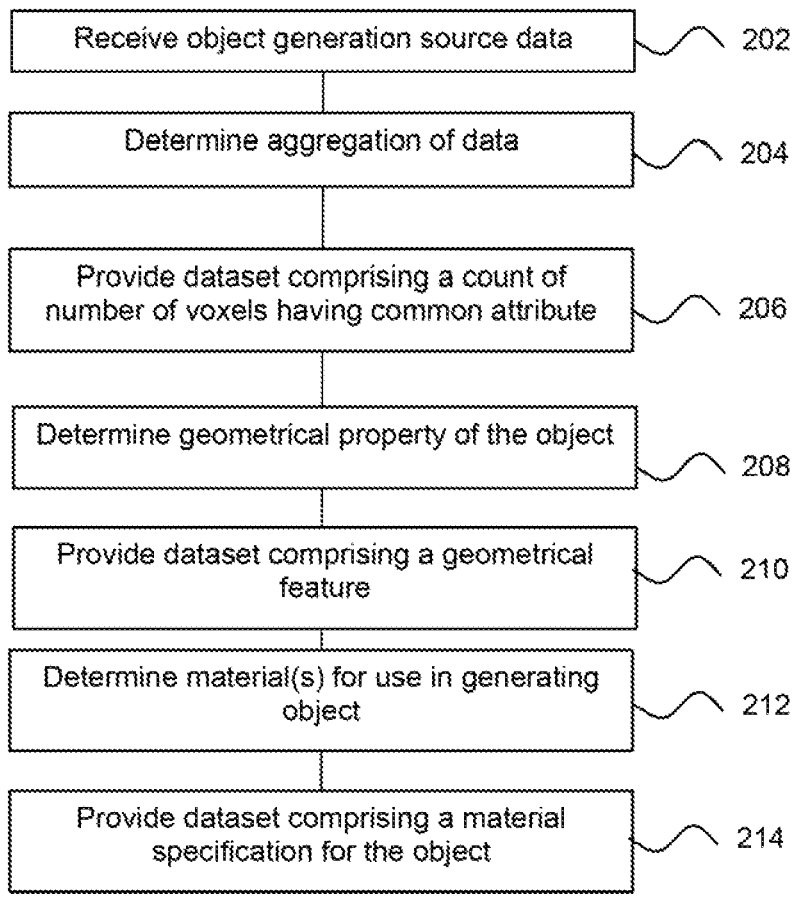
FIG. 2 is a flowchart of an example method of determining datasets.

FIG. 2 represents an example workflow in preparing and transmitting data for object generation in additive manufacturing.

In block 202, object generation source data is received. In this example, the object is described on a voxel-by-voxel basis. Each voxel has at least one associated attribute (e.g. present, absent, at least one property, etc.). In other examples, different object representation formats may be used.

Block 204 comprises determining an aggregation of the data to provide, in block 206, a determined dataset comprising a count of a number of voxels having a common attribute.

For example, this may comprise counting the number of red (or more generally colored) voxels, the number of conductive voxels, the number of transparent voxels, number of external voxels, the number of empty voxels, or the like. Indeed, it may comprise aggregating any data supplied on a 'per voxel', or voxel-by-voxel, basis to determine the number of voxels in an object having a particular attribute (which as noted above could be a property or an indication of the presence or absence of a feature). Such an aggregation may therefore provide an object summary in terms of a number of voxels having at least one attribute.

In some examples, the aggregation may be carried out for some attributes and not others. In some examples, the aggregation may be carried out for attribute combinations (for example, counting the voxels which are red and transparent separately from voxels which are red and opaque). In some examples, the common attribute may be defined at a higher level than in the object generation source data. For example, while the object generation source data may mention red, green and blue pixels, the aggregation may be carried out to determine the number of voxels having at least one color. In some examples, the aggregation may be carried for specified attributes, for example those specified, requested or expected by a workflow participant which is to receive the dataset. In such an example the data relating to attributes may be extracted from the object generation source data and decoupled from data relating to the object's geometry.

Block 208 comprises determining, from the object generation source data, a geometrical property of the object, to provide, in block 210, a dataset representing at least one geometrical feature (i.e. representing a geometrical aspect of the object). Such a geometrical feature may be determined in a manner which is decoupled from data relating to voxel attributes (or more generally, object properties).

In some examples, a geometrical feature may be a full representation of the object geometry. For example, this may comprise a vector or other representation of the object. In some examples, this may comprise a representation of just part of an object, or an object dimension or the like. For example, it may describe the smallest cuboid (or some other geometrical shape) which encloses the object, or specify an object portion having a feature size which is below a threshold value, or the smallest feature size, characterise the size of any voids, provide the bounding volume, provide an extracted feature of the geometry in which some details are omitted, or the like.

Block 212 comprises determining, from the object generation source data, at least one material for use in generating the object, to provide, in block 214, a dataset comprising a material specification for the object. In examples in which the object data specifies properties rather than materials, this may comprise processing the data, for example using mapping tables and the like, to determine which print materials may be used and/or combined to produce or approximate the property or properties specified thereby.

The datasets generated in blocks 206, 210 and 214 are examples of partial representations of the object. While each of the datasets provides information which may be of use in generating the object, no one dataset provides the full information to enable object generation (and subsequent manufacturing). Such datasets may be transmitted to third parties in the knowledge that at least some additional effort would be called for to allow an object to be generated and thus the value of the data in itself may be less than the value of the object generation source data.

In some examples, at least some such datasets are generated/derived early in the workflow. In some examples, this may before any particular entities to receive the datasets have been identified and/or before any request for data from an entity in the workflow. In some examples, datasets may be generated or derived in anticipation of the datasets which may be of use in a possible or example workflow. For example, it may be the case that an operator cannot provide an object generation apparatus with the intended object generation materials until information allowing the materials and/or amounts is provided. This may be anticipated in advance, or a dataset may be generated around the intended time of use. The datasets may be generated in a secure location, at which the object generation source data may be available in an unencrypted form.

At least two, and in some example, each, of the datasets generated in blocks 206, 210 and 214 may have different digital protections applied thereto. For example, they may be encrypted using different keys, may be protected with different levels of security, and/or may be subject to different security policies (e.g. different access rights, different certification, digital signatures etc.). For example, the derived datasets may be individually encrypted and digitally signed. In some examples, the datasets may be sent or accessed individually or as a combination to or by particular workflow entities, or to or by all workflow entities. Different access keys may for example allow individual entities to access the content of one or some datasets, and not others.

Figure 3:
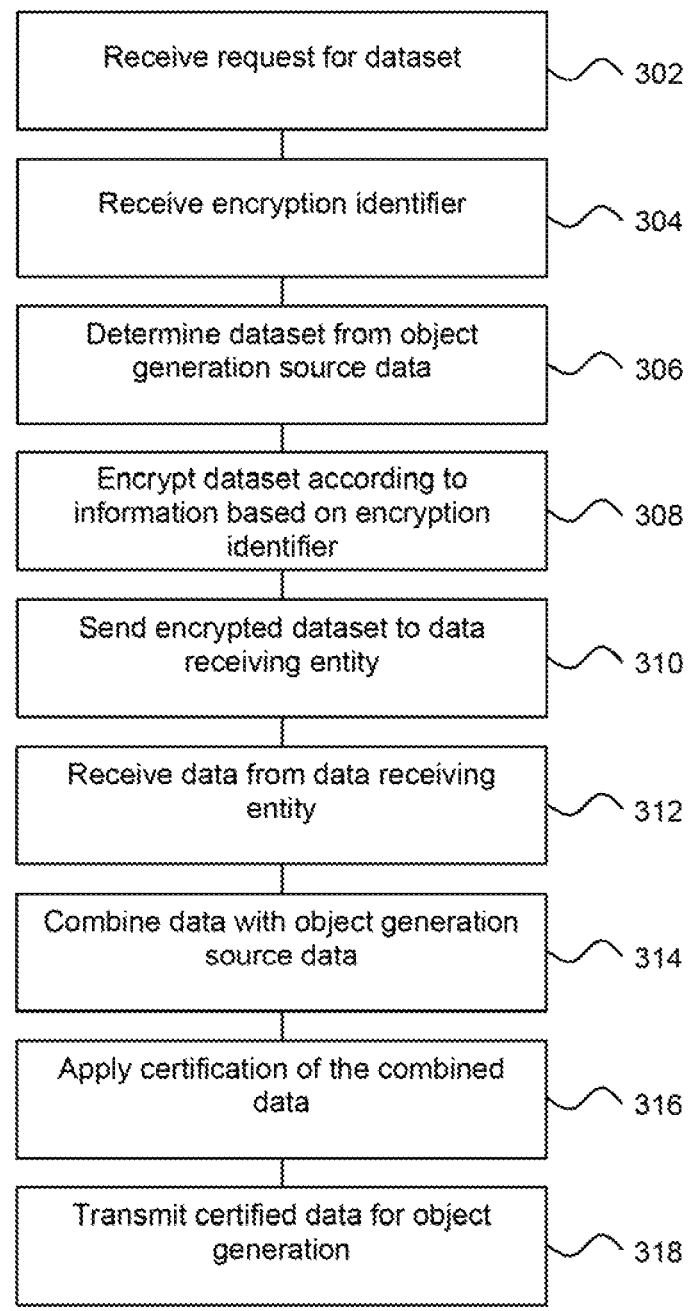
FIG. 3 is a flowchart of an example method of determining and transmitting a dataset.

FIG. 3 is a flowchart showing an example of communication between a particular data receiving entity and a data source, wherein the data source has access to the object generation source data. In some examples, the data source is under the control of the workflow owner and the data receiving entity is a workflow participant. This example considers a case in which a dataset is generated in response to a request from the data receiving entity, although in other examples, a dataset may be held by the data source, in some examples having digital security already applied thereto. In such examples, block 306 may have been carried out before any request for data is received as set out in block 302.

In block 302, a request for a dataset is received by the data source. In some examples this request may be sent from the data receiving entity. This request may for example comprise an indication of a dataset type (for example, a voxel aggregation dataset, a geometric feature dataset, a materials dataset, an appearance aspect dataset, or some other dataset) and/or a dataset content (for example, which geometric features or properties are of interest).

Block 304 comprises receiving, at the data source, an encryption identifier. In some examples, this may comprise, or identify, a key, for example a public key, of the data receiving entity. In other examples, this may comprise a suggestion that key data be retrieved from or agreed via a trusted third party, or that key data is derived or identified in some other way.

In block 306, a dataset is determined from the object generation source data. Thus, a data receiving entity may receive data which is tailored to the particular function to be performed thereby. For example, this may comprise geometrical information to be used for batching (for example, this may allow an object manufacturer to determine if an object may be rotated for better packing, of if it provides a void in which another object may be manufactured, or if it may be manufactured alongside, or in a void of, another object or objects, or the like). In another example, this may comprise a list of materials, or an aggregation of voxel-by-voxel data (or some other summary of property data), or the like. In some examples, the query may be based on the capabilities of the data receiving entity: for example, the query be a request to learn if the object generation source data suggests the use of any material other than a list (which may for example be the use of available materials at a particular object generation apparatus), or a specification of the maximum size for an object to be generated thereby. In such an example, a dataset could comprise a simple indication of 'yes' or 'no'.

In some examples, prior to determining or transmitting such a dataset, the request may be verified. For example, it may be determined if the request originates from an authorised entity and/or if the dataset requested is reasonable or appropriate to send to the data receiving entity. This may comprise considering predetermined permissions to determine if the data receiving entity is authorised to receive data as will be included in the requested dataset, considering the identity of the intended recipient, and/or its role, or the like. Verifying the request may comprise determining if the data requested is appropriate given the intended recipient's identity and/or role. In some examples, workflow participants may be identified by their public keys, or by a certificate or the like. The workflow owner may then determine the role of any identified workflow participant in the workflow and may refer to stored information regarding the data which may be provided to allow the workflow participant to perform their task.

For example, a potential manufacturer may request specific metadata of a 3D object, such as volume, material, colors, etc. to provide a job estimate/quotation whereas a "3D job packager" may request information on bounding volumes (tight packaging) of individual 3D objects to be manufactured (tight packaging) as well as intended quantities of objects to be manufactured. However, it may not be relevant to provide the 3D job packager with color information and therefore a request for such data may be denied.

In block 308, the dataset is encrypted according to information based on the encryption identifier. In other examples, the dataset may be encrypted using a key from some other source. The dataset may be encrypted following generation thereof, for example, where the intended recipient of the data is known in advance, with a key known to that recipient or with a key which may be distributed to the intended recipient subsequently once its authority to receive the dataset is established.

In block 310, the encrypted dataset is sent to a data receiving entity. In some examples, the dataset may also be certified, for example by application of a digital signature. This may assure the receiving entity of the validity and integrity of the information therein.

Block 312 comprises receiving, at the data source, data from the data receiving entity. This may for example comprise a modification of the dataset sent thereto. For example, this data may comprise an estimate of a cost or a timescale for manufacture, or some other object generation commitment. In some examples, it may comprise a request for data modification (for example, the object may be manufactured, but may differ from the supplied data in at least one aspect, such as a property or geometrical attribute, or a color or the like). In block 314, this data may be combined with object generation source data. In some examples, the addition of such data may be authorised with respect to some workflow participants but not others. For example, some workflow participants may have 'write access' while others may have read-only access. In some examples, different rights may apply to different portions of the data. In some examples, prior to combining or accepting data, the data source may verify that the data is received form an entity which is permitted to modify the data.

Block 316 comprises applying a certification of the combined data. This may in effect bind the received data to the object generation source data such that both the workflow owner and data receiving entity can be assured of the agreed basis on which an object may be generated. In this example, in block 318, the certified data, which comprises object generation source data (which in some example may have been modified) is transmitted for object generation by an object generation apparatus. The object may thereafter be generated. In some examples, the certification may comprise a digital signature.

Figure 4:
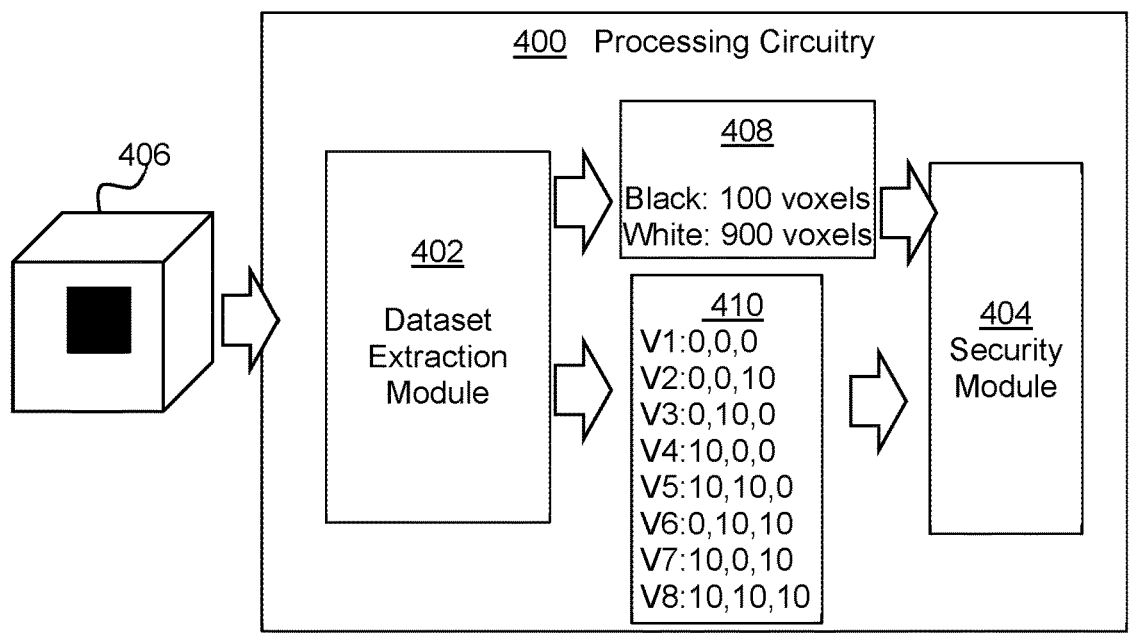
FIG. 4 is a schematic representation of an example processing circuitry.

FIG. 4 is an example of a processing circuitry 400 comprising a dataset extraction module 402 and a security module 404.

The dataset extraction module 402 extracts, from object generation source data 406 representing a three dimensional object to be generated using additive manufacturing, a first dataset 408 characterising a first aspect of the object and a second dataset 410 characterising a second aspect of the object. In the example of the figures, the object generation source data 406 is a voxel-by-voxel representation of a 1000-voxel cube in which some voxels are white and other are black. The first dataset 408 comprises an aggregation of the attributes of the voxels, in this case based on color and comprising 10% black voxels (100 voxels) and 90% white voxels (900 voxels). The second dataset 410 comprises a geometrical representation of the object describing its volume, in this case using the [x,y,z] coordinates of its vertices. However, the datasets 408, 410 may comprise any dataset representing an aspect of the object, for example any dataset as described above.

The security module 404 applies digital security to the datasets, wherein the digital security differs between the first and second dataset. For example, the datasets 408, 410 may be encrypted using different keys, be subject to different security policies (for example, whether read-only, or read/write access is allowed), be subject to different encryption techiques or have access to the content thereof may be otherwise differentially controlled.

Figure 5:
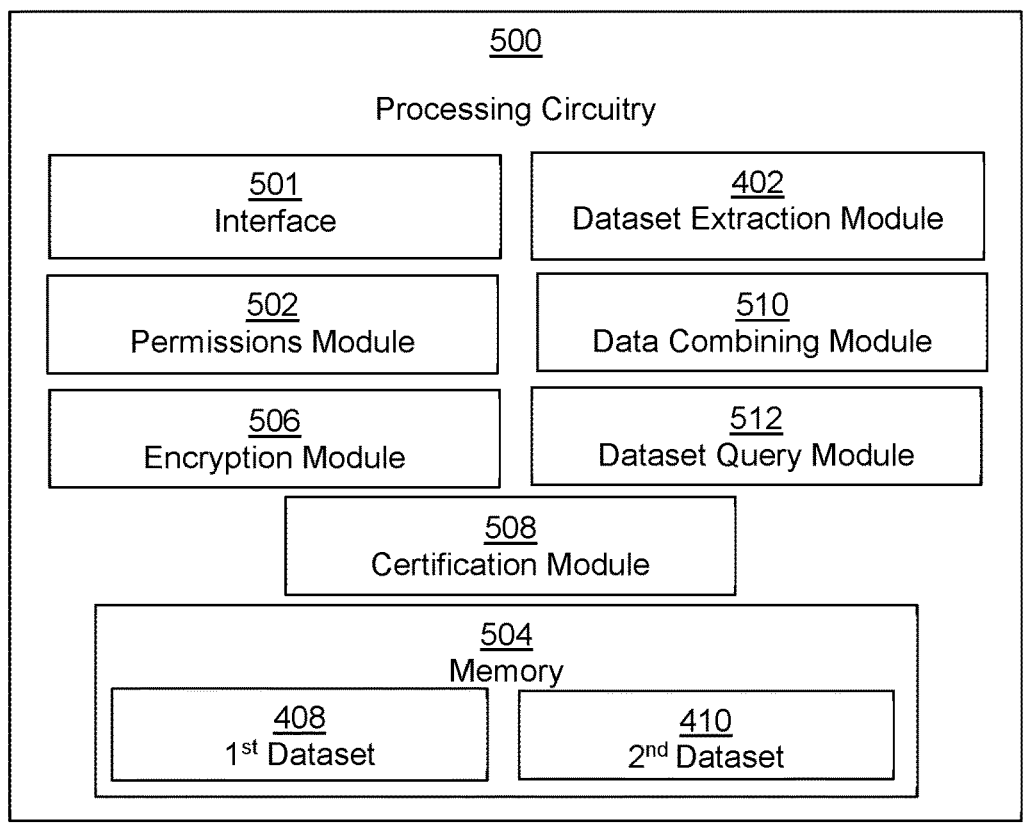
FIG. 5 is a schematic representation of another example processing circuitry.

FIG. 5 is another example of processing circuitry 500. Such processing circuitry 500 may be under the control of, or trusted by, a workflow owner. In this example, in addition to dataset extraction module 402 described in relation to FIG. 4, the processing circuitry 500 further comprises an interface 501, a permissions module 502, a memory 504, an encryption module 506, a certification module 508, a data combining module 510, and a dataset query module 512. In this example, the permissions module 502, encryption module 506 and certification module 508 each provide components of a security module.

The interface 501 transmits and/or allow access to at least one of the first and second dataset 408, 410. The interface 501 may also receive requests for datasets (for example as described in relation to block 302 above). The processing circuitry 500 may process those requests (for example as described in relation to block 306 and/or block 308 above) and the interface 501 may transmit the resulting dataset (for example as described in relation to block 106 or block 310 above). The interface 501 may also receive data from the recipient of the dataset (for example as described in relation to block 312 above).

The permissions module 502 in this example is to assign an access permission to at least one, and in some examples, to each, dataset. In some examples, the permissions module 502 may assign an access permission to the object generation source data. This may for example control recipients of a dataset/source data to be specified recipient(s) or classes of recipient(s). Such permissions may be assigned on generation of a dataset 408, 410 or subsequently. The memory 504 is to store at least one dataset 408, 410 in association with any assigned access permission.

In some examples, a record associated with a single three-dimensional object stored in a memory may comprise a number of discreet data objects (for example, data files). For example, a record associated with a single three-dimensional object stored in a memory may comprise the original object generation source data 406 and at least one dataset 408, 410. At least some of the source data 406 and the datasets 408, 410 may be stored as separate data objects, and may have digital protection applied thereto individually.

The encryption module 506 is to encrypt a dataset and/or the object generation source data before transmission thereof (for example, as described in relation to block 308 above). The certification module 508 issues a certificate to data prior to transmission. This may assist in verifying the authenticity of data, whether comprising the full source data 406 representing the object, any individual dataset, or the like. In some examples, such encryption may be applied following generation of a dataset. In other examples, a dataset may be encrypted on demand, for example, just prior to transmission thereof.

The data combining module 510 associates data with the object generation source data 406. This may for example comprise creating an association between the object generation source data 406 and a dataset 408, 410, or an association with data received from another source, for example a recipient of a dataset as is described in relation to blocks 312 and 314 above. A certificate issued by the certification module 508 may certify this association.

The dataset query module 512 determines a dataset to be extracted by the dataset extraction module 402. For example, this may comprise determining what data is to be included in a dataset and/or what processing should be applied to the object generation source data 406. Such a module may be of use when a previously un-encountered request for a dataset having particular content is received. In other examples, a dataset query module 512 may be updated with new queries for example by an authorised entity. This may for example occur as an update to the processing circuitry 500, for example to allow different datasets to be extracted.

Figure 6:
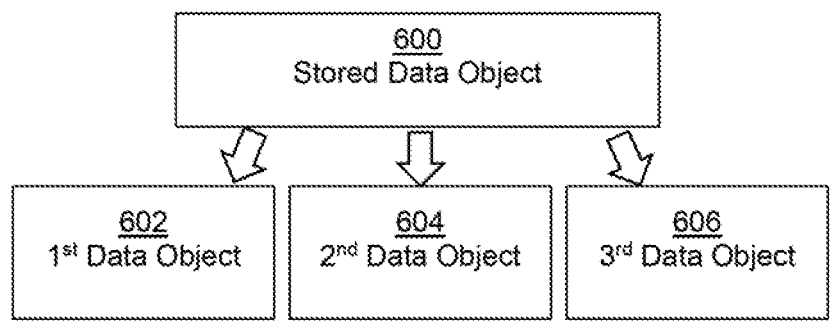
FIG. 6 is a schematic representation of a method of determining datasets.

FIG. 6 is an illustration of a method for developing a data record for an object to be generated using additive manufacturing techniques. The method may be carried out in a secure host computer.

A stored data object 600 representing a three-dimensional object is transformed into a plurality of data objects 602, 604, 606.

A first data object 602 comprises data allowing a three-dimensional object generation apparatus to generate an object (for example, object generation source data). In some examples, the data content of the first data object 602 may be the same as the data content of the stored data object (and the transformation may be transforming one data object to three data objects, wherein the original data object 600 is unchanged and is now identified as the first data object 602). The first data object may be in the form of control data, for example for use directly by an object generation apparatus to determine how materials may be treated and/or combined to generate the object, for example on a layer-by-layer basis. In other examples, the first data object 602 may comprise a full description of the geometry of the design as well as, where applicable, any properties and/or materials thereof, which is sufficient to allow such control data to be determined, for example using look-up tables, halftoning techniques, and the like. In some examples, first data object 602 comprises data allowing a three-dimensional object generation apparatus to generate an object automatically (i.e. without user intervention).

A second data object 604 represents a first aspect of the object based on data extracted from the stored data object 600 and a third data object 606 represents a second, different, aspect of the object based on data extracted from the stored data object 600. In some examples, the second and third data objects 604, 606 may have any of the attributes of the datasets described above.

Digital security may be applied to at least two data objects 602, 604, 608, wherein the digital security differs between data objects 602, 604, 608. For example, this may assist in controlling access to the content of the data objects, and/or in controlling processing thereof. In some examples, the data objects may be sent or accessed together or separately to or by workflow entities. The digital security may be such that only authorised entities can readily access the content of appropriate data objects. The 'appropriate' data objects for an entity may be determined at least substantially on a 'need-to-know' basis, i.e. data objects to which access is a prerequisite to allow the entity to perform its role may be deemed appropriate for that entity, whereas those data objects which do not contain such data may be determined to be inappropriate for that entity, and access thereto by that entity may be prevented. In some examples, an entity may be able to readily access one or some, but not all, data objects.

In examples, one of the second and third data objects 604, 606 may comprise an aggregation of the number of voxels have at least one common attribute, or may be a portion of the stored data object 600 (i.e. is data which is extracted from the stored data object 600, but is otherwise appear as it is appear inside the stored data object 600), or may be derived from the stored data object 600 using to at least one predetermined data processing operation.

In some examples, the data objects 602, 604, 606 may be in a Publicly Posted Composite Document (PPCD) format. One or some data object(s) may be computed prior to any request being received, while other data objects may be created 'on-the-fly' in response to a request. The data objects 602, 604, 606 may for example be stored as database objects, for example in an SQL or SQLite database environment. In some examples, at least some of the data objects may have access rights applied thereto. In another example, objects could be combined together in a compressed or archiving file format such as a zip file, 7z file, tar file or other file format.

A secure host computer may also provide the services of a workflow owner. For example, a secure host computer may anticipate/determine information to provide a dataset in advance of its request. It may also create a secure template with any or all workflow participants, for example using cryptographic keys (which may be public keys). Such a template may be used to enforce pre-defined access rights for participants in the workflow.

A secure host computer may provide a secure environment on a remote computer, for example using software, which may be in the form of a plug-in. For example, this may provide a customer with tools that automatically gather/compute the information for the workflow. A customer may use such tools provided on their own computer and, in some examples a workflow template specifying which entities may be provided with particular data content. The tools may be used to gather information to form datasets or data objects, which may be wrapped into a secure (for example PPCD-formatted) workflow template, in which dataset(s)/data object(s) may be encrypted in a manner which is accessible to a 3D object generation/additive manufacturing apparatus or next trusted secure point, whilst providing other workflow information to workflow participants/agents according to their roles/needs, so that downstream workflow participants may be provided with information allowing the smooth and efficient workflow running, while maintaining the confidentiality of underlying object generation source data. Thus, in some examples, the methods of FIGS. 1-3 may be carried out on a customer computer using software.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus and devices (for example, the dataset extraction module 402, security module 404, interface 501, permissions module 502, encryption module 506, certification module 508, data combining module 510 and/or the dataset query module 512) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   acquiring, at a processor, three-dimensional object generation source data including a plurality of datasets of the source data representing a three-dimensional object to be generated for use in additive manufacturing, the three-dimensional object generation source data including data describing the three-dimensional object to be generated on a voxel-by-voxel basis, each voxel being associated with at least one attribute;

determining, using the processor, a dataset representative of an aspect of the three-dimensional object for a particular recipient and/or activity, from among the plurality of datasets of the three-dimensional object generation source data, the determining the dataset includes aggregating voxel-by-voxel data and the determined dataset including a count of a number of voxels having a common attribute; and applying, using the processor, digital security including an encryption key to the determined dataset, the digital security including the encryption key applied to the dataset to correspond to the particular recipient and/or activity and to differ from a digital security including an encryption key applied to the object generation source data, to enable generation of the dataset determined to be representative of the aspect of the three-dimensional object for the particular recipient and/or activity according to the digital security including the encryption key applied to the determined dataset.

2. A method according to claim 1 in which in the determining the dataset comprises determining, from the three-dimensional object generation source data, a geometrical feature of the three-dimensional object to be generated as the aspect of the three-dimensional object and the dataset comprises the geometrical feature.

3. A method according to claim 1 in which the dataset provides a partial representation of the three-dimensional object.

4. A method according to claim 1 wherein each dataset of the plurality of datasets being representative of a different aspect of the three-dimensional object.

5. A method according to claim 1 further comprising receiving a request for data relating to the three-dimensional object and the determining determines the dataset in response to the request.

6. A method according to claim 1 further comprising:
receiving, at the processor, data from the recipient of the dataset, and combining, by the processor, the received data with the three-dimensional object generation source data.

7. A method according to claim 6 further comprising:
applying, by the processor, a certification to the combined data; and transmitting the combined data and certification for generation of the three-dimensional object by an object generation apparatus.

8. Processing circuitry comprising:
a processor to couple to a memory and to,
perform an extraction, from three-dimensional object generation source data, a first dataset characterising a first aspect of a three-dimensional object to be generated for a first particular recipient and/or activity and a second dataset characterising a second aspect of the three-dimensional object to be generated for a second particular recipient and/or activity, the three-dimensional object generation source data including data describing the three-dimensional object to be generated on a voxel-by-voxel basis, each voxel being associated with at least one attribute, and the extraction includes aggregating voxel-by-voxel data and the first and second datasets, respectively, including a count of a number of voxels having a common attribute; and apply digital security including an encryption key to the first dataset and the second dataset, respectively, wherein the digital security including the encryption key differs between the first and second datasets, to enable generation of the first and second datasets characterising the first and second aspects of the three-dimensional object for the first and second particular recipient and/or activity, respectively.

9. Processing circuitry according to claim 8 wherein the processor is to assign an access permission to each of the first dataset and the second dataset, and the memory is to store the first and second dataset and the assigned access permission.

10. Processing circuitry according to claim 8 further comprising a security processor comprising any one or combination of an encryption processor or a certification module to apply the digital security.

11. Processing circuitry according to claim 8 wherein the processor is to associate data with any one or combination of the object generation source data, the first dataset, or the second dataset.

12. Processing circuitry according to claim 8 wherein the processor is to determine the dataset to be extracted in response to a query.

13. A method comprising:
transforming, in a secure host computer, a stored data object representing a three-dimensional object into a plurality of data objects, the plurality of data objects comprising:
a first data object comprising data representing the three-dimensional object,
a second data object representing a first aspect of the three-dimensional object generated based on data extracted from the stored data object, and
a third data object representing a second, different, aspect of the three-dimensional object based on data extracted from the stored data object;
the method further comprising:
applying digital security including an encryption key to at least two data objects, from among the first, second and third data objects, for respective particular recipients and/or activities, wherein the digital security differs between the at least two data objects, to enable generation of the first and second data objects representing the first and second aspects of the three-dimensional object for the particular recipients and/or activities, respectively, according to the digital security including the encryption key applied to the first and second data objects, respectively,
wherein the stored data object characterises the three-dimensional object on a voxel by voxel basis, each voxel being associated with at least one attribute and at least one of the second and third data objects is determined from a representation of the three-dimensional object on a voxel by voxel basis and includes any one or combination of:
an aggregation of a number of voxels have at least one common attribute;
a portion of the stored data object characterizing the three-dimensional object; and data derived from the stored data object characterizing the three-dimensional object using at least one data processing operation.

\* \* \* \* \*